United States Patent Office  3,629,352
Patented Dec. 21, 1971

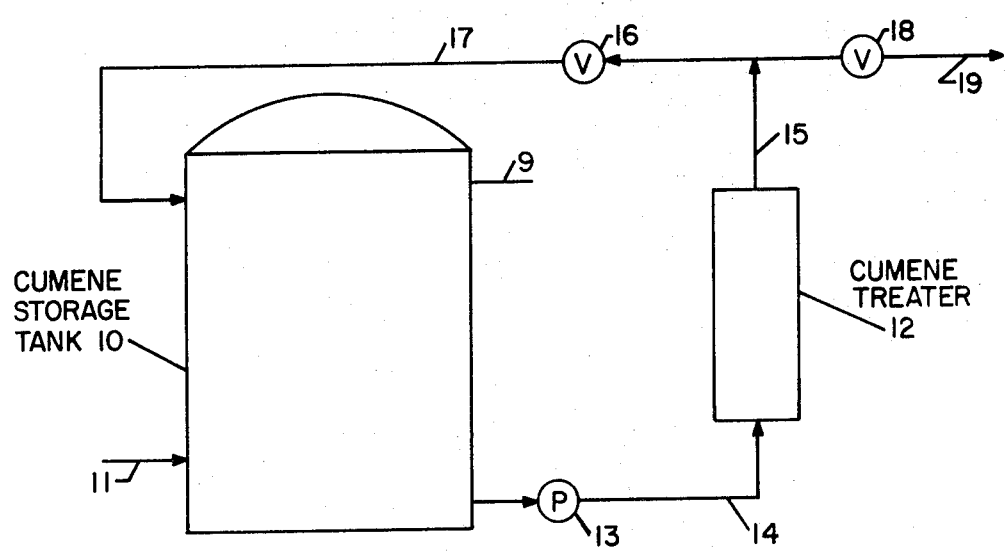

3,629,352
REDUCTION OF HYDROPEROXIDE CONTENT OF CUMENE
Theodore S. Hoover, Corpus Christi, Tex., assignor to Sun Oil Company, Philadelphia, Pa.
Filed June 27, 1969, Ser. No. 837,281
Int. Cl. C07c 7/18, 7/12
U.S. Cl. 260—674 A                       5 Claims

ABSTRACT OF THE DISCLOSURE

Cumene containing a small percentage of hydroperoxide is treated in liquid phase with activated carbon to reduce the hydroperoxide content.

---

This invention relates to the treatment of cumene for the purpose of reducing its hydroperoxide content. The invention is particularly useful in preventing build-up of the hydroperoxide content of cumene during storage.

Cumene is made commercially by the alkylation of benzene with propylene and is largely used for the preparation of phenol. See, for example, McNaughtan U.S. Pat. No. 2,906,789, issued Sept. 29, 1959. The procedure involves first the oxidation of cumene to cumene hydroperoxide and then in a subsequent step splitting the hydroperoxide into phenol and acetone using a mixture of sulfuric and perchloric acids as catalyst. In each of these steps the desired reactions can be adversely affected by various impurities in the reactant materials even when they are present in small amounts. It is desirable, therefore, that the cumene utilized as feed for this process be of high purity.

During storage of cumene there is a tendency for its hydroperoxide content to increase due to reaction with oxygen in the system. This tends to occur in practice even when measures are established to exclude air, as when the vapor space in the storage zone is blanketed with an inert gas such as natural gas. In spite of precautions normally taken, the hydroperoxide content of the cumene often will build up to an unacceptable level during storage. Discoloration of the cumene tends to occur as its hydroperoxide content increases.

Cumene which is to be employed as feed for the above-mentioned process of making phenol customarily is required to have a low hydroperoxide content. A typical commercial specification for cumene to be used for this purpose permits not more than 100 p.p.m. of hydroperoxide therein. The hydroperoxide content is determined by a method essentially like the ASTM procedure designated as D1022-64. This maximum specification for hydroperoxide content must be met even though the first step of the process involves the conversion of cumene to the hydroperoxide. The reason is that during storage and transportation of the cumene its hydroperoxide, even though present in small percentage, may convert into various derivatives, such as $\alpha,\alpha$-dimethylbenzyl alcohol, acetophenone, $\alpha$-methylstyrene and dicumylperoxide, which can act as poisons in the phenol production process. Maintaining the hydroperoxide content of the cumene low prior to use thus minimizes the possibility of developing poisons therein in detrimental amounts.

The present invention provides an efficacious way of maintaining the hydroperoxide content of cumene at a low level such as below 100 p.p.m. The procedure involves treating the cumene in liquid phase with activated carbon. The treatment can be carried out merely by contacting the liquid cumene with activated carbon. The temperature of treatment can vary widely being, for example, at any level in the range of 40–200° F. Higher or lower treating temperatures also can be used. Ordinarily, the cumene will be at ambient storage tank temperature, such as in the range of 60–120° F.

Any of the commercially available activated carbons can be used for the present purpose. These materials are well known and are described, for example, in Encyclopedia of Chemical Technology, vol. 2, pp. 881–898 (1948).

The effectiveness of activated carbon in reducing the hydroperoxide content of cumene is illustrated by the following comparative laboratory tests. Each test was conducted by packing treating agent in a 1″ O.D. x 12″ glass column and passing one quart of hydroperoxide-containing cumene through the column at room temperature. For comparison activated alumina and KOH were separately used as treating agents. The feed material and the treated cumene were tested for hydroperoxide content by a procedure essentially like ASTM D1022-64. Results are shown in Table I.

TABLE I

| Treating agent | Hydroperoxide content, p.p.m. | |
|---|---|---|
|  | Feed | Effluent |
| Activated carbon | 150 | Nil |
| Activated alumina | 150 | 150 |
| KOH | 150 | 150 |

The results in Table I show that only activated carbon had any effect in reducing the hydroperoxide content of the cumene.

The accompanying drawing is a diagrammatic flowsheet illustrating use of the invention in order to prevent build-up of hydroperoxide content of cumene during storage.

With reference to the drawing, numeral 10 illustrates a storage tank to which cumene can be introduced by line 11. Tank 10 may be provided with means, illustrated by line 9, for admitting or removing natural gas to or from the tank so as to prevent air breathing as the cumene level varies in the tank. Adjacent tank 10 a treating column 12 is provided through which cumene can be circulated by means of pump 13 and line 14. Column 12 contains a bed of the treating agent, i.e., activated carbon. The cumene from storage tank 10 passes at ambient temperature through column 12 in contact with the activated carbon which reduces the hydroperoxide content to a negligible value. The effluent cumene from line 15 can be recycled via line 17 containing valve 16 to the storage tank or can be passed from the system through valve 18 and line 19, or part of it can be returned to storage and part can be removed from the system.

By operating in the foregoing manner, an inventory of cumene can be maintained in storage tank 10 with a low hydroperoxide content readily meeting commercial specifications. It is presumed that the cumene hydroperoxide is adsorbed as such on the activated carbon, although there is the possibility that it is converted to other oxygenated material (e.g., $\alpha,\alpha$-dimethylbenzyl alcohol, acetophenone or dicumylperoxide) which is retained by the activated carbon. In any event the hydroperoxide content of the cumene is effectively reduced by the treatment. As a general rule, the activated carbon will remove on the order of 0.2–0.5 lb. of hydroperoxide per pound of the adsorbent before it needs to be replaced or regenerated. Regeneration can be effected, if desired, by heating and steaming the used adsorbent and then purging the same with natural gas in a manner similar to certain regeneration steps in the procedure disclosed in Brant et al. U.S. Pat. No. 2,981,771, issued Apr. 25, 1961.

The following is a specific example of plant use of the invention in the manner illustrated by the accompanying drawing:

Cumene from a benzene alkylation unit was being stored in tank 10 under an atmosphere of natural gas. Nevertheless the hydroperoxide content of the cumene built up to 222 p.p.m., thus considerably exceeding the commercial specification of 100 p.p.m. maximum. A column 12 was then provided (5′ diameter x 20′ height), which was packed with a bed of activated carbon (10′ depth) containing 5400 lbs. of the adsorbent. The cumene from tank 10, which at that time contained 35,000 bbls. of cumene, was continuously circulated through the adsorbent bed and back to the storage tank at a rate of about 200 gal./min. Samples were taken from time to time of the feed to and effluent from the treater, and these were tested for hydroperoxide content. Results are shown in Table II.

TABLE II

| Time | Hydroperoxide content, p.p.m. | |
|---|---|---|
| | Treater feed | Treater effluent |
| At start | 222 | Nil. |
| 3 days | 103 | Nil. |
| 5 days | 71 | Nil. |

The results in Table II show that contacting the cumene with activated carbon effectively reduced its hydroperoxide content. During the treating period shown, essentially no cumene hydroperoxide was present in the treater effluent and the hydroperoxide content of the storage tank material continuously dropped reaching commercial specifications within 4 days. It was found that continuing the treatment for a more extended time reduced the hydroperoxide content of the inventory cumene in tank 10 to below 20 p.p.m. Under these conditions it was also found that the activated carbon typically lasted for about 90 days before it needed to be replaced or regenerated.

The amount of cumene that can be treated per pound of activated carbon will, of course, depend upon the hydroperoxide content of the material being treated. As a typical illustration, when the hydroperoxide content of the cumene feed is 100 p.p.m. and the effluent contains less than 10 p.p.m. of hydroperoxide, a yield of the order of 600–900 gals./lb. of activated carbon can be obtained before the activated carbon needs to be replaced or regenerated.

The invention claimed is:

1. Method of treating cumene containing a small percentage of cumene hydroperoxide to reduce the hydroperoxide content which comprises contacting the cumene in liquid phase with activated carbon.

2. Method according to claim 1 wherein said temperature is in the range of 40–200° F.

3. Method according to claim 1 wherein said temperature is in the range of 60–120° F.

4. In the storage of cumene in a storage zone wherein the content of cumene hydroperoxide in the cumene normally tends to increase with time, the method of preventing build-up of the hydroperoxide content which comprises circulating the cumene from the storage zone in liquid phase at a temperature in the range of 40–200° F. through a contact zone containing activated carbon and returning the thus treated cumene to said storage zone.

5. Method according to claim 4 wherein said temperature is in the range of 60–120° F.

References Cited
UNITED STATES PATENTS

| | | | |
|---|---|---|---|
| 1,856,571 | 5/1932 | Lourens | 208—307 |
| 2,993,903 | 7/1961 | Kraus | 260—666.5 |
| 3,270,072 | 8/1966 | Pesacreta | 260—666.5 |
| 3,417,158 | 12/1968 | Forry et al. | 260—674 |

DELBERT E. GANTZ, Primary Examiner

C. E. SPRESSER, Jr., Assistant Examiner

U.S. Cl. X.R.

208—263, 307